(12) United States Patent
Toba et al.

(10) Patent No.: US 12,339,641 B2
(45) Date of Patent: Jun. 24, 2025

(54) DISTRIBUTED SYSTEM AND DATA TRANSMISSION METHOD

(71) Applicant: Hitachi, Ltd., Tokyo (JP)

(72) Inventors: Tadanobu Toba, Tokyo (JP); Kenichi Shimbo, Tokyo (JP); Yutaka Uematsu, Tokyo (JP); Takumi Uezono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 515 days.

(21) Appl. No.: 17/451,424

(22) Filed: Oct. 19, 2021

(65) Prior Publication Data

US 2022/0163942 A1 May 26, 2022

(30) Foreign Application Priority Data

Nov. 20, 2020 (JP) ................ 2020-193217

(51) Int. Cl.
*G05B 19/406* (2006.01)
*G06F 11/07* (2006.01)
*G06F 11/34* (2006.01)
*G06F 11/30* (2006.01)

(52) U.S. Cl.
CPC ........ *G05B 19/406* (2013.01); *G06F 11/0709* (2013.01); *G06F 11/3495* (2013.01); *G05B 2219/32356* (2013.01); *G06F 11/3006* (2013.01); *G06F 11/3058* (2013.01); *G06F 11/3409* (2013.01)

(58) Field of Classification Search
USPC ........................................... 700/109
See application file for complete search history.

(56) References Cited

U.S. PATENT DOCUMENTS

| | | | | |
|---|---|---|---|---|
| 11,615,654 | B1* | 3/2023 | Krotosky | ............. G07C 5/0866 701/31.4 |
| 11,675,042 | B1* | 6/2023 | Lloyd | ..................... H02S 50/00 136/246 |
| 2010/0057292 | A1* | 3/2010 | Ishikawa | ................ G07C 5/085 701/31.4 |
| 2013/0197777 | A1* | 8/2013 | Sloan | ............... B60K 15/03006 701/102 |

(Continued)

FOREIGN PATENT DOCUMENTS

JP 2005-300390 A 10/2005

*Primary Examiner* — Emilio J Saavedra
(74) *Attorney, Agent, or Firm* — Crowell & Moring LLP

(57) ABSTRACT

The subject is to provide a technique of dealing with an internal state of a controller in an edge device by cooperation between an edge device and a computer such as a cloud server, and to generalize data communication for the cooperation and reduce an amount of data communication. Provided is a distributed system including an edge device and a diagnostic data computer. The edge device includes an in-edge controller including at least a processing unit, and a system element to be monitored by the in-edge controller. The processing unit diagnoses presence or absence of an abnormality in the processing unit due to an abnormality occurring in the system element, generates first diagnostic data indicating presence or absence of the abnormality of the processing unit, converts the first diagnostic data into second diagnostic data indicating a type of the abnormality of the processing unit, and transmits the second diagnostic data to the diagnostic data computer.

6 Claims, 8 Drawing Sheets

(56) References Cited

U.S. PATENT DOCUMENTS

| | | | |
|---|---|---|---|
| 2016/0246659 A1* | 8/2016 | Komatsu | G06F 11/0748 |
| 2016/0306691 A1* | 10/2016 | Aneja | G06F 11/0709 |
| 2019/0223178 A1* | 7/2019 | Bergström | H04W 72/0446 |
| 2019/0340844 A1* | 11/2019 | Tonshal | G07C 5/0808 |
| 2020/0051419 A1* | 2/2020 | Malaver | H04L 67/10 |
| 2020/0164633 A1* | 5/2020 | Takagi | B41J 2/04581 |
| 2020/0364953 A1* | 11/2020 | Simoudis | G06N 20/00 |

\* cited by examiner

[FIG. 1]
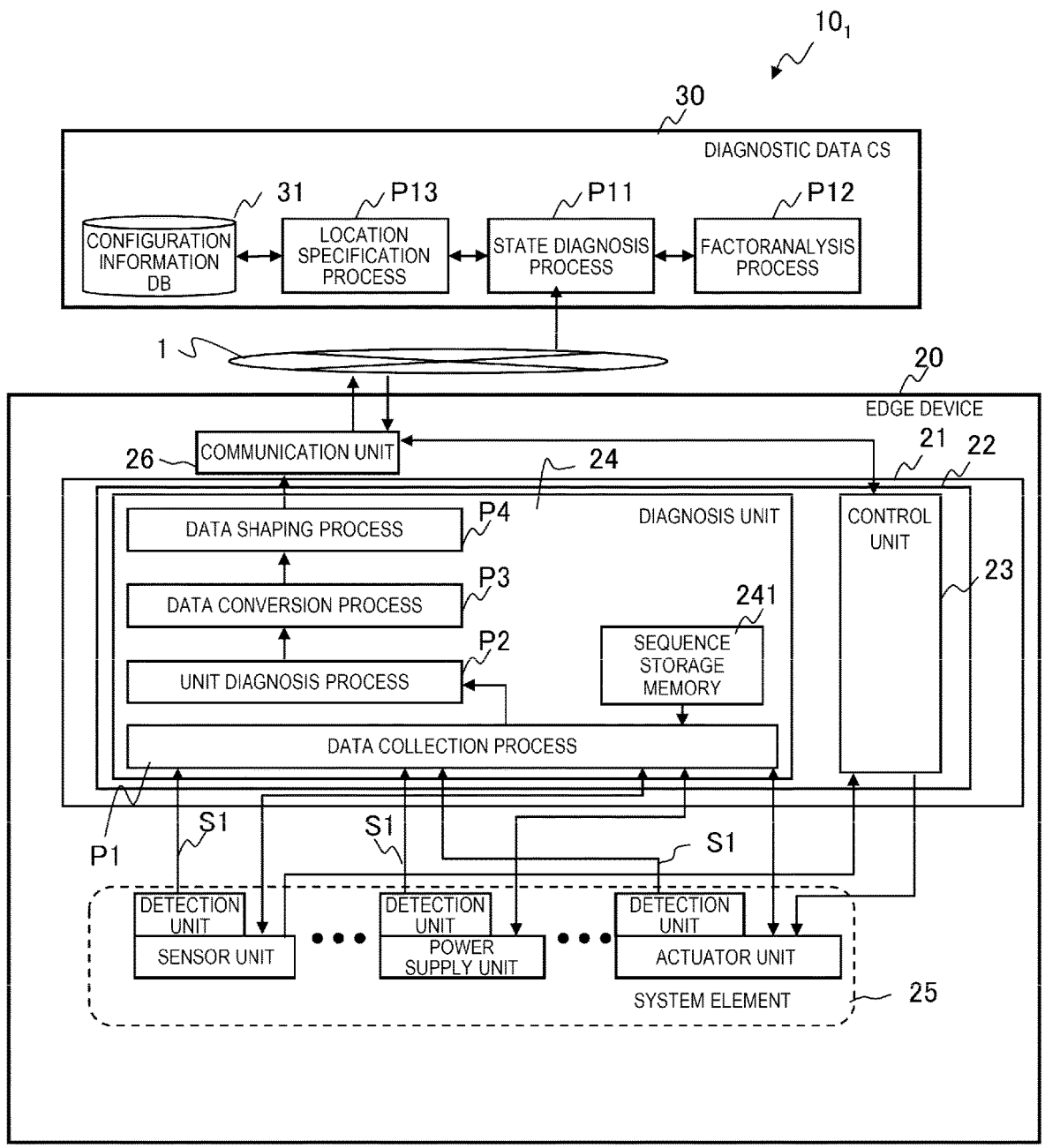

[FIG. 2]
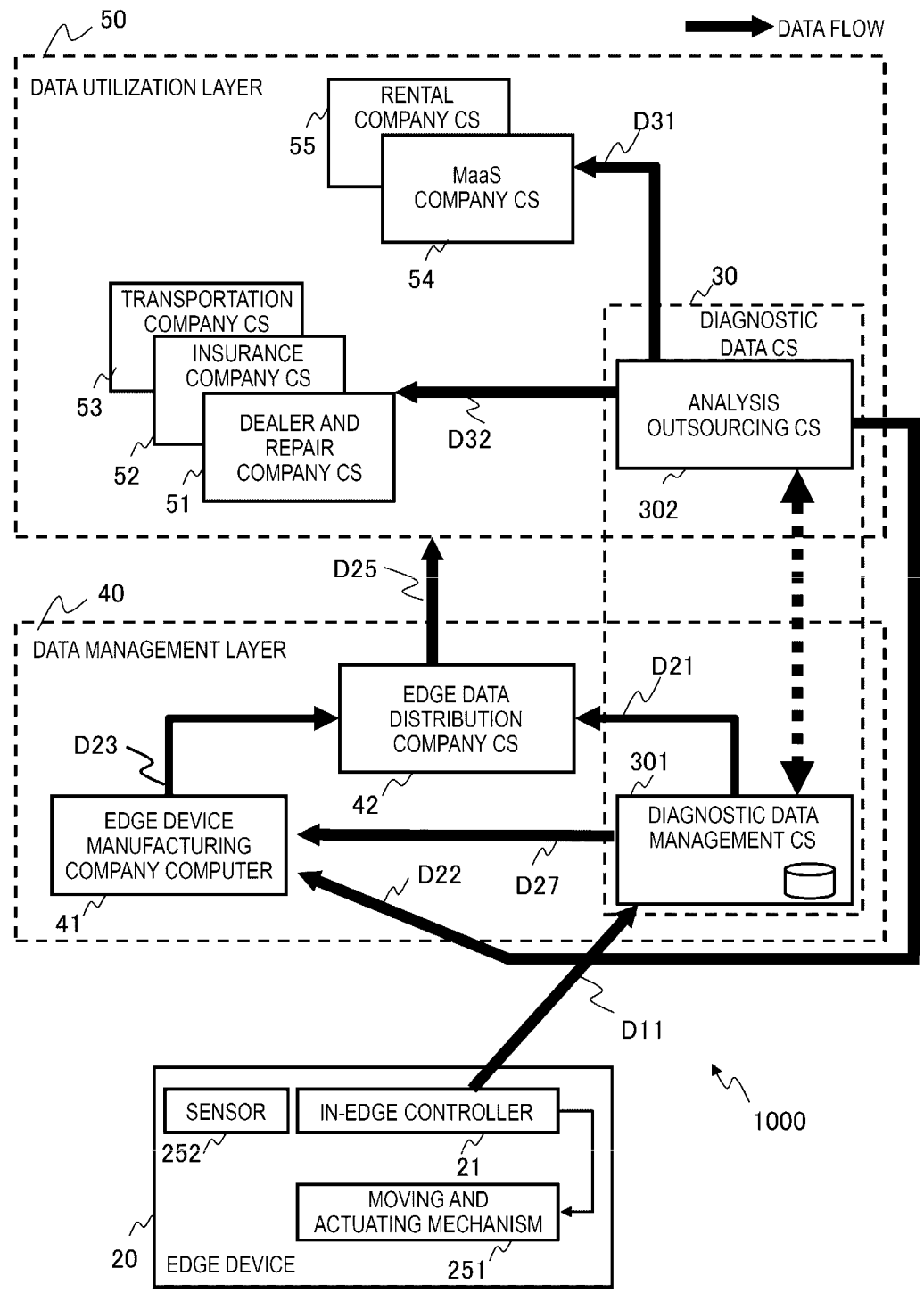

[FIG. 3]
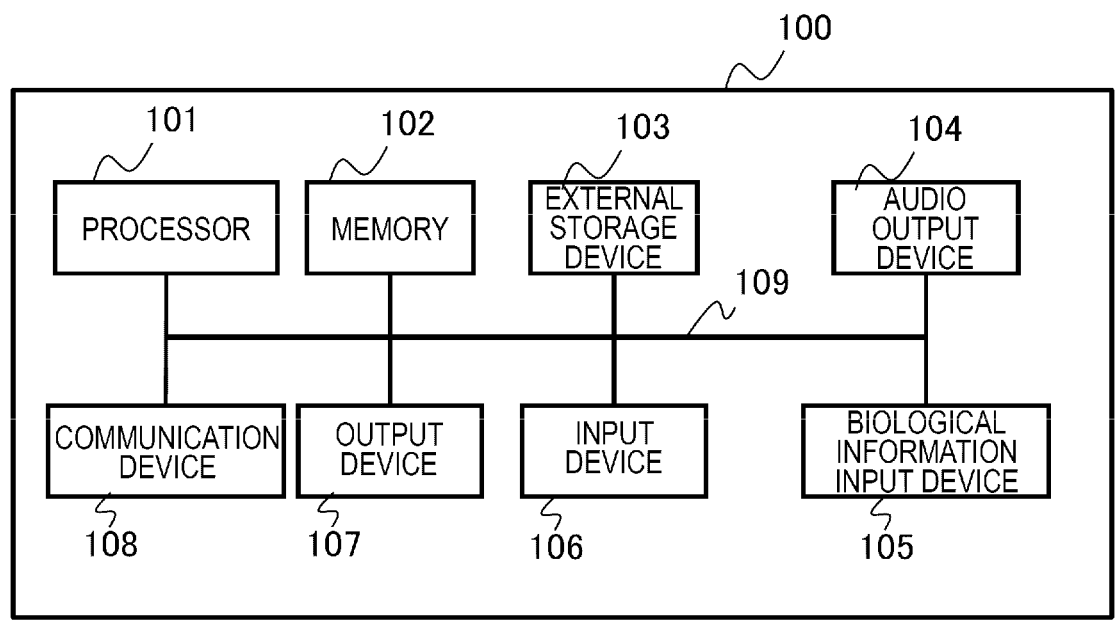

[FIG. 4]
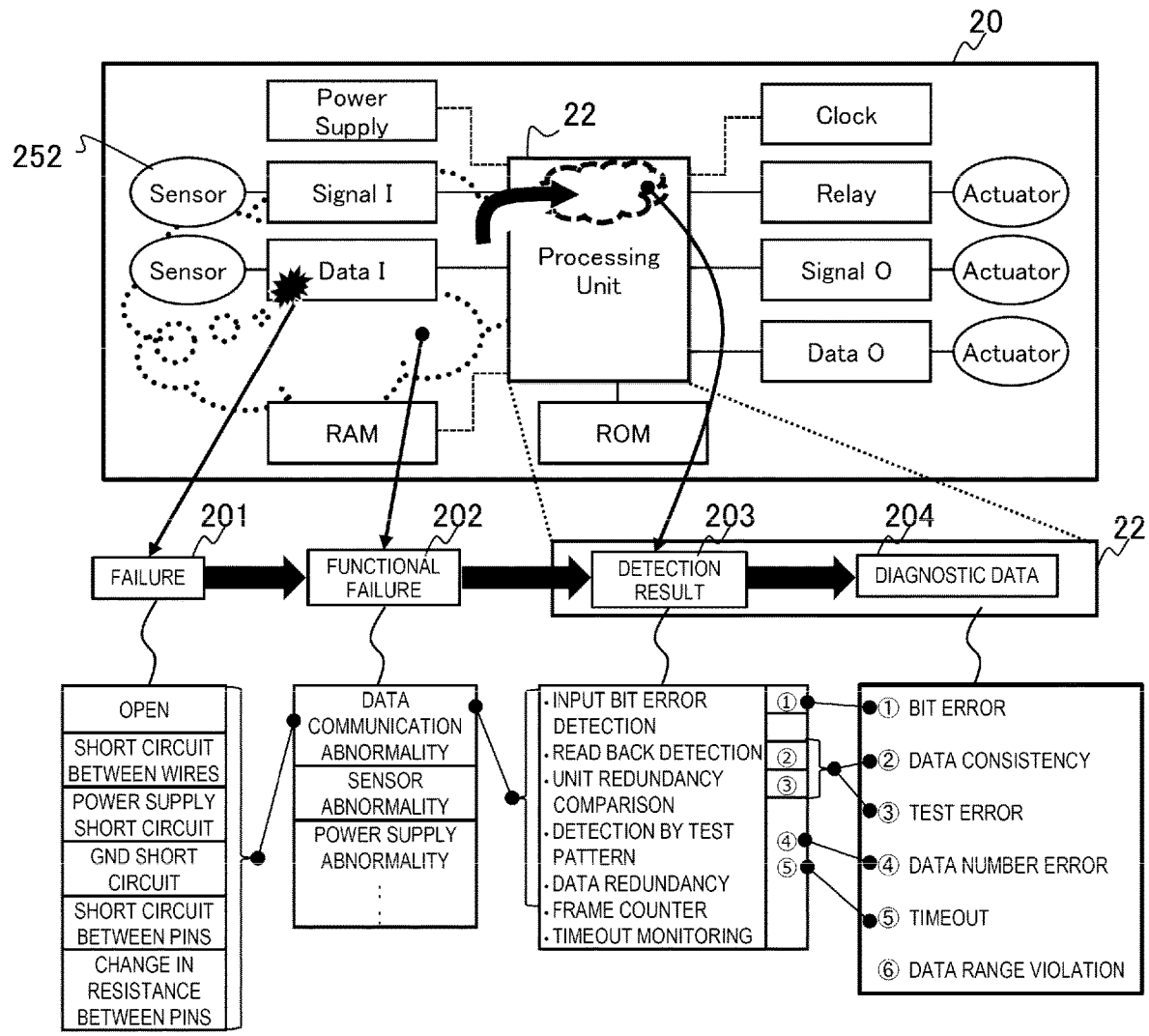

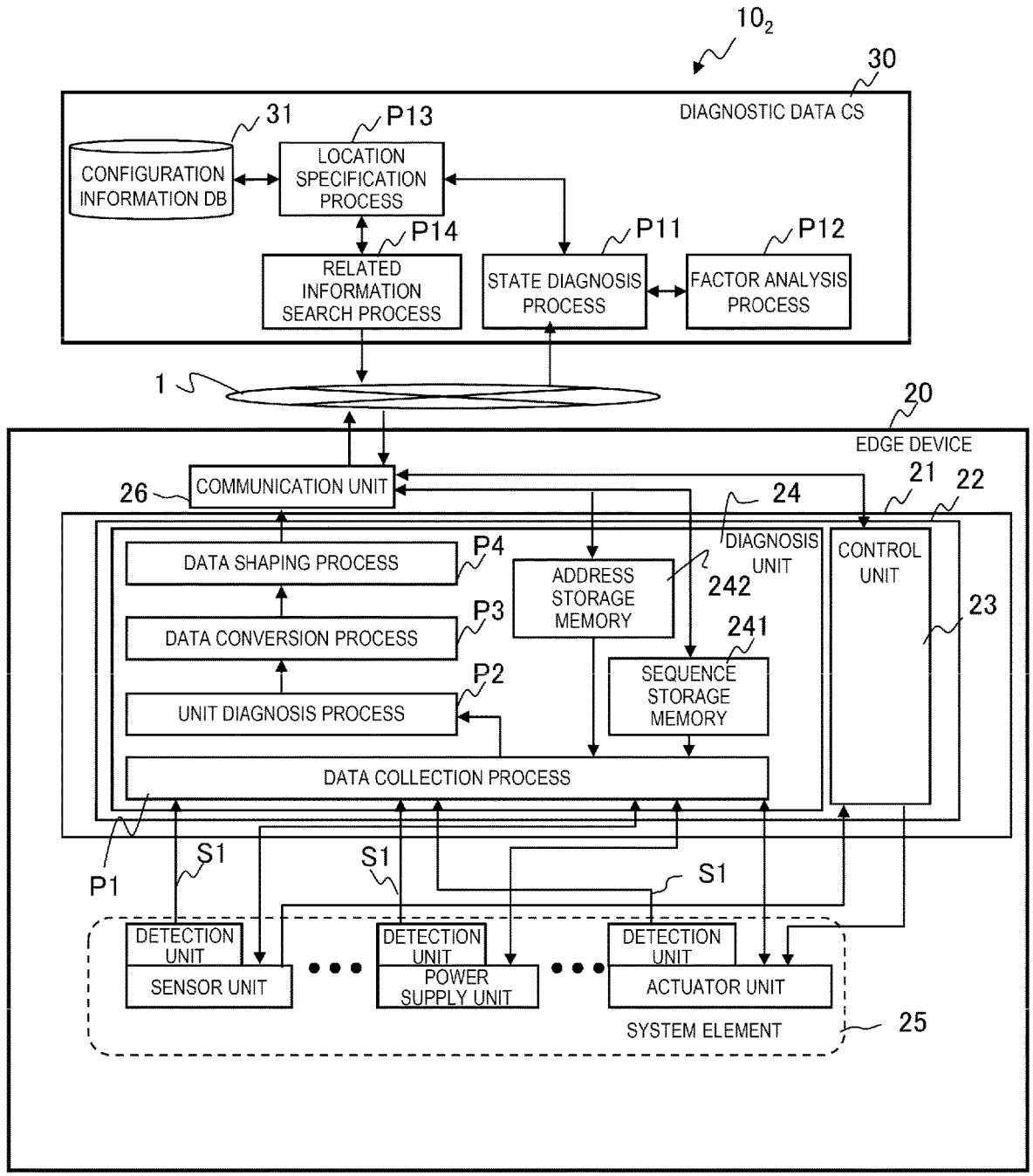
[FIG. 5]

[FIG. 6]
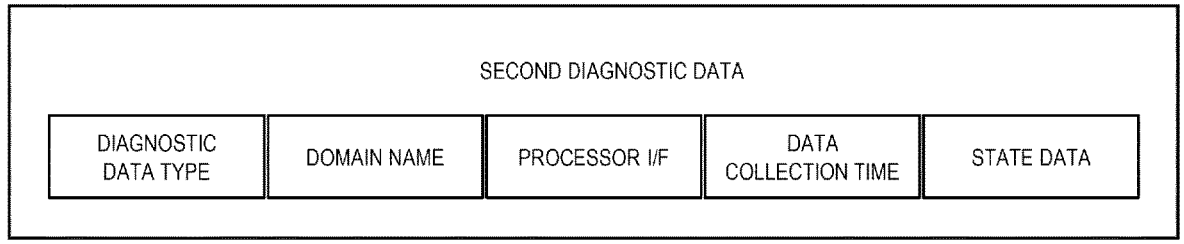
[FIG. 7]
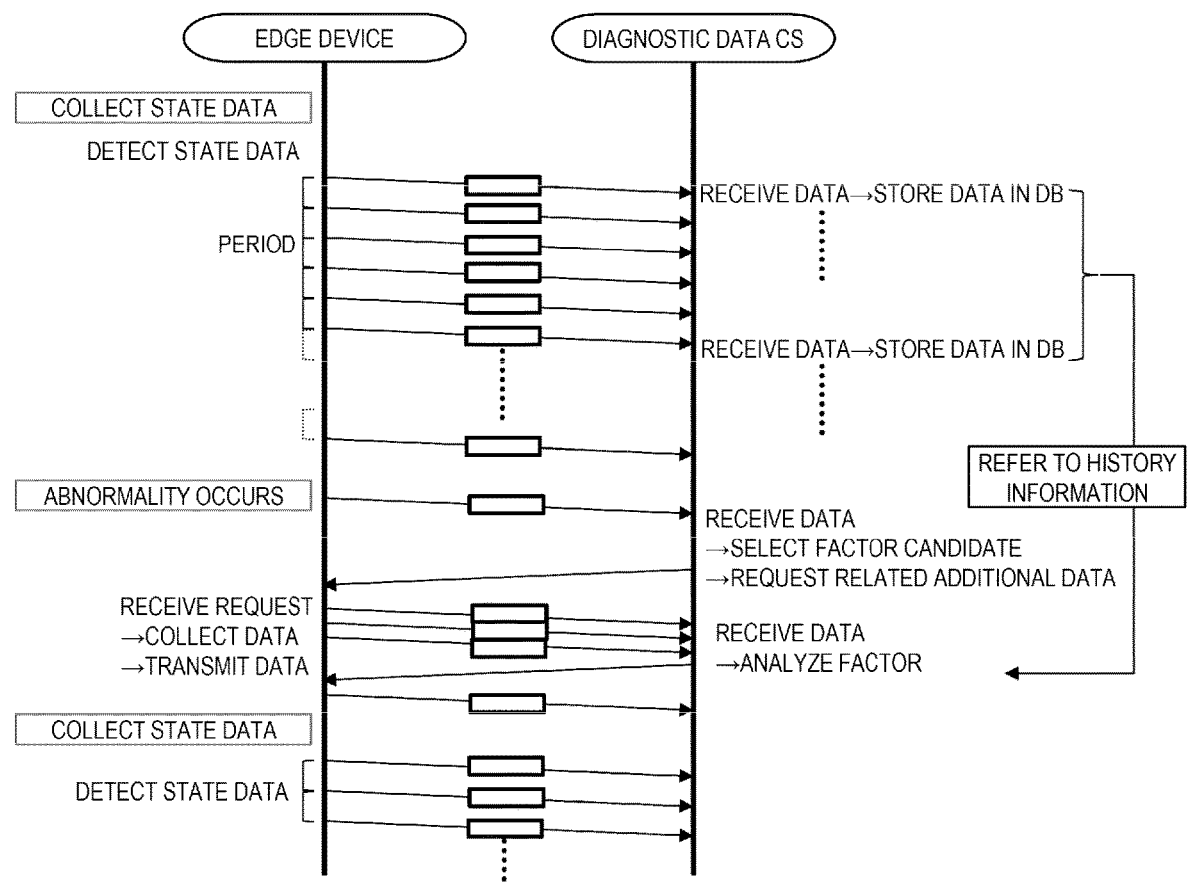

[FIG. 8]
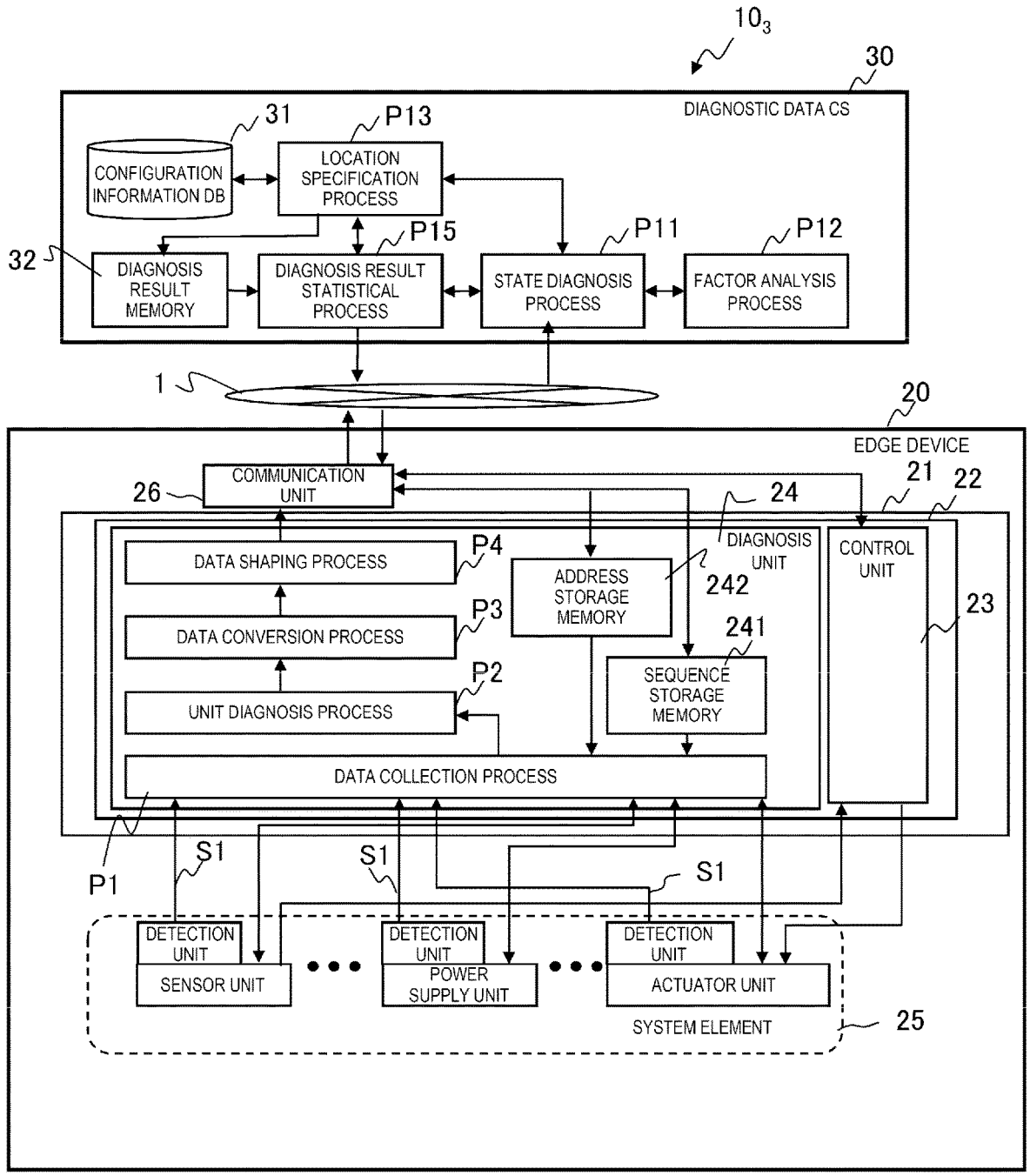

[FIG. 9]
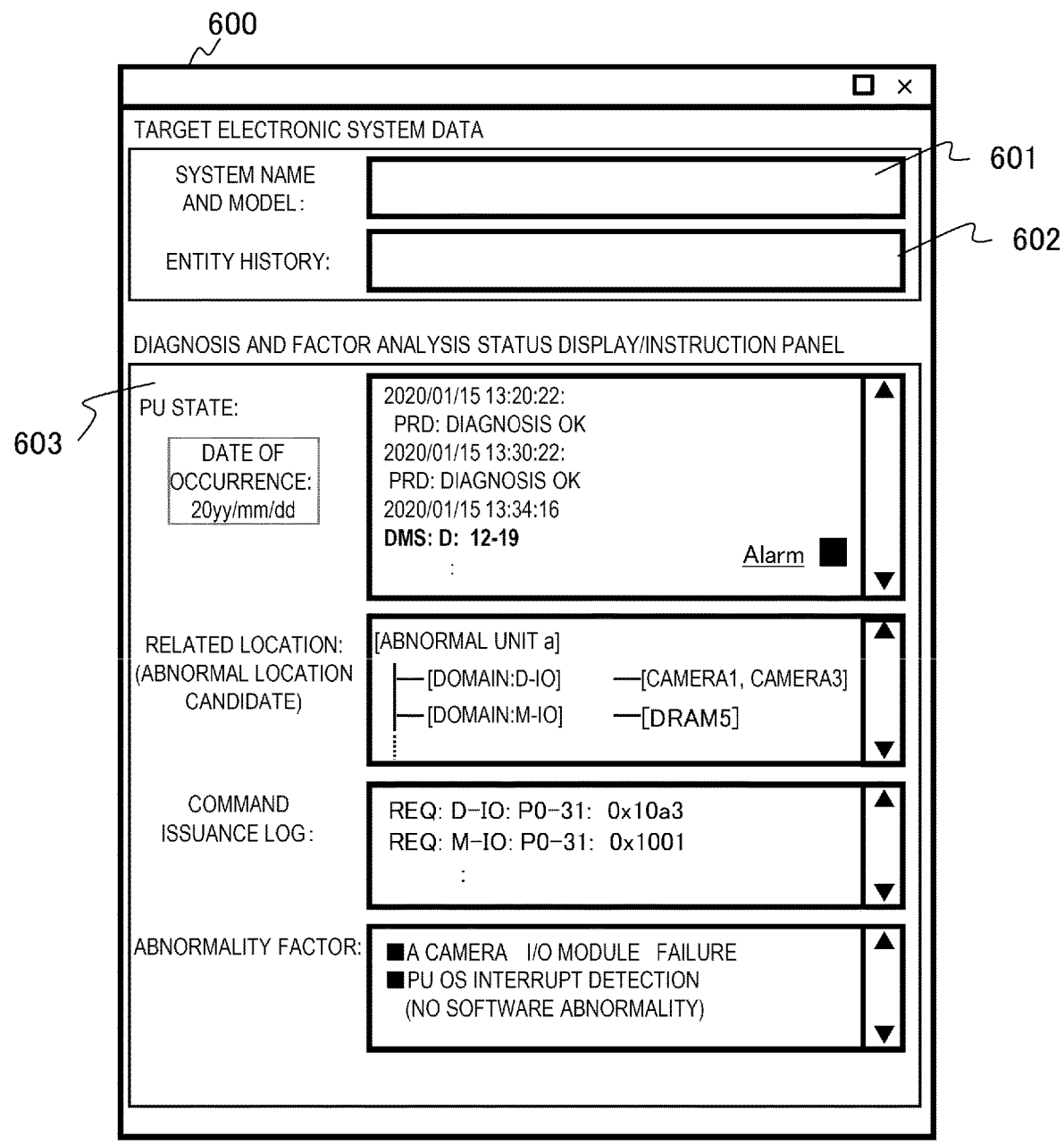

DISTRIBUTED SYSTEM AND DATA TRANSMISSION METHOD

TECHNICAL FIELD

The present invention relates to a distributed system and a data transmission method.

BACKGROUND ART

Patent Literature 1 describes a configuration in which a monitoring device mounted on a vehicle includes an interface for communicating with a diagnostic device, an ECU, a server device, and the like. When receiving a request from the diagnostic device, the monitoring device selects a communication connection destination based on a vehicle state, acquires information from the connection destination, and transmits the information to the diagnostic device. Furthermore, Patent Literature 1 describes that, in the server device, a database in which a maintenance manual (inspection procedure) is stored is searched for and an optimum maintenance procedure is presented, and that latest information is always presented to a repair person when the maintenance procedure is updated.

CITATION LIST

Patent Literature

PTL 1: JP-A-2005-300390

SUMMARY OF INVENTION

Technical Problem

A controller in an edge device may be complicated to implement an automatically operable moving body. The controller controls a moving mechanism in a moving body represented by a motor or an engine or an actuation mechanism in equipment represented by an actuator. In this case, the controller in the edge device may take various types of internal states. Furthermore, elimination of these internal states (particularly, abnormal states) is not limited to a type of internal state that can be restored only inside the edge device.

In the technique described in Patent Literature 1, the monitoring device monitors an internal state (particularly, an abnormal state) of each component in the ECU, collects physical state data unique to each component, and transmits the physical state data to an outside of the edge device. Therefore, a type and a format of data is unique to each component or hardware configuration mounted on the edge device, and an amount of data to be transmitted and received is large since physical data is communicated as it is.

The server device that receives the data collected by the monitoring device cannot cope with plural types of phenomena, data, and abnormal states occurring in a complex manner only by using the received data for comparison with past cases. Furthermore, the server device cannot deal with an internal state of the controller in the edge device in cooperation with the edge device without performing a factor analysis using the collected data.

The invention is made in view of the above circumstances. An object of the invention is to provide a technique of dealing with an internal state of a controller in an edge device by cooperation between the edge device and a computer such as a cloud server, and to make it possible to generalize data communication for the cooperation and reduce an amount of data communication.

Solution to Problem

The present application includes plural systems that solve at least a part of the above problems. An example of the systems is as follows.

In order to solve the above problems, a distributed system according to an embodiment of the invention includes an edge device that is at least one of an automatically operable moving body and equipment, and a diagnostic data computer. The edge device includes an in-edge controller including at least a processing unit, and a system element to be monitored by the in-edge controller. The processing unit diagnoses presence or absence of an abnormality in the processing unit due to an abnormality occurring in the system element, generates first diagnostic data indicating presence or absence of the abnormality in the processing unit, converts the first diagnostic data into second diagnostic data indicating a type of the abnormality in the processing unit, and transmits the second diagnostic data to the diagnostic data computer.

Advantageous Effects

According to the invention, it is possible to provide a technique of dealing with an internal state of a controller in an edge device by cooperation between an edge device and a computer such as a cloud server, and to generalize data communication for the cooperation and reduce an amount of data communication.

Problems, configurations, and effects other than those described above will become apparent from the following description of embodiments.

BRIEF DESCRIPTION OF DRAWINGS

FIG. 1 is a diagram showing a configuration example of a distributed system according to a first embodiment of the invention.

FIG. 2 is a diagram showing an application example of the distributed system.

FIG. 3 is a diagram showing an example of a hardware configuration of a computer.

FIG. 4 is a diagram showing a method for classifying a failure factor and diagnostic data in components of an edge device.

FIG. 5 is a diagram showing a configuration example of a distributed system according to a second embodiment of the invention.

FIG. 6 is a diagram showing an example of a data structure of diagnostic data.

FIG. 7 is a diagram showing an example of a transmission and reception protocol of state data.

FIG. 8 is a diagram showing a configuration example of a distributed system according to a third embodiment of the invention.

FIG. 9 is a diagram showing a display example of an information presentation screen.

DESCRIPTION OF EMBODIMENTS

In the following embodiments, the description may be divided into plural sections or embodiments if necessary for convenience. Unless particularly specified, the sections or embodiments are not independent of each other, but have a relation in which one section or embodiment is a modification, detailed description, supplementary description, or the like of a part or all of another section or embodiment.

In the following embodiments, when reference is made to the number of elements and the like (including a count, a numeric value, an amount, a range, and the like), unless otherwise specified or theoretically apparently limited to a specific number, the number is not limited to the specific number and may be either equal to or larger than or equal to or less than the specific number.

In the following embodiments, it is needless to say that elements (including steps and the like) are not necessarily essential unless otherwise particularly specified or clearly considered to be essential in principle.

Similarly, in the following embodiments, when reference is made to shapes, positional relations, and the like of the elements or the like, the elements or the like include those having substantially approximate or similar shapes or the like unless otherwise particularly specified or clearly considered to be not the case in principle. The same applies to numerical values and ranges.

In all the drawings for describing the embodiments, the same members are denoted by the same reference numerals in principle, and repetitive descriptions thereof will be omitted. Hereinafter, each embodiment of the invention will be described with reference to the drawings.

<Configuration Example of Distributed System 10₁ According to First Embodiment of Invention>

FIG. 1 shows a configuration example of a distributed system 10₁ according to a first embodiment of the invention.

The distributed system 10₁ includes an edge device 20 and a diagnostic data cloud server (CS) 30. The edge device 20 is connected to the diagnostic data cloud server 30 via a network 1. The network 1 is, for example, a bidirectional communication network represented by a mobile phone communication network, the Internet (including Ethernet), or the like.

As the edge device 20, for example, an automatically operable moving body (for example, a vehicle, a drone, or a robot) or equipment (for example, a robot arm, a machine tool, or a numerically controlled lathe) is assumed. Here, it is assumed that an automatic operation includes automatic driving.

The edge device 20 includes an in-edge controller 21, a processing unit 22, a system element 25, and a communication unit 26.

The in-edge controller 21 includes one or more processing units 22. The processing unit 22 includes a control unit 23 that controls the system element 25, and a diagnosis unit 24 that generates diagnostic data indicating a state of the processing unit 22.

The control unit 23 controls an actuator unit included in the system element 25 based on, for example, sensing information from a sensor unit included in the system element 25.

The diagnosis unit 24 includes a sequence storage memory 241 that stores a collection procedure (including a collection cycle) when collecting state data of the sensor unit, a power supply unit, the actuator unit, and the like, which are components of the system element 25. The diagnosis unit 24 executes a data collection process P1, a unit diagnosis process P2, a data conversion process P3, and a data shaping process P4. Details of each process will be described later.

The system element 25 includes the sensor unit, the power supply unit, the actuator unit, and the like that are components of the edge device 20, and plural detection units that detect abnormalities of the components. The sensor unit, the power supply unit, the actuator unit, and the like output state data indicating their own states to the diagnosis unit 24. Each of the detection units monitors a state of a corresponding one of the sensor unit, power supply unit, actuator unit, and the like, and outputs an abnormality signal S1 to the diagnosis unit 24 when an abnormality is detected.

The communication unit 26 transmits shaped second diagnostic data input from the diagnosis unit 24 to the diagnostic data cloud server 30 via the network 1.

The diagnostic data cloud server 30 includes one or more computers present on the network 1. In the present embodiment, one or more local computers may be adopted instead of a cloud server such as the diagnostic data cloud server 30. Conversely, a cloud server may be adopted instead of a local computer.

The diagnostic data cloud server 30 corresponds to a diagnostic data computer of the invention. The diagnostic data cloud server 30 includes a configuration information database 31. In the configuration information database 31, information indicating the components (the sensor unit, the power supply unit, the actuator unit, and the like) of the edge device 20 is stored in association with identification information unique to the edge device 20. The configuration information database 31 stores the second diagnostic data transmitted from the edge device 20.

The diagnostic data cloud server 30 executes a state diagnosis process P11, a factor analysis process P12, and a location specification process P13. Details of each process will be described later.

<Operation Overview of Distributed System 10₁>

In the distributed system 10₁ configured as described above, as the data collection process P1, the diagnosis unit 24 of the edge device 20 collects the state data from the components included in the system element 25 according to the collection procedure stored in the sequence storage memory 241.

Next, as the unit diagnosis process P2, the diagnosis unit monitors an operation state of the processing unit 22, diagnoses presence or absence of an abnormality, and generates first diagnostic data indicating a diagnosis result.

Next, as the data conversion process P3, when there is no abnormality in the processing unit 22, the diagnosis unit 24 converts the first diagnostic data into second diagnostic data including information that there is no abnormality and a part of the state data collected from the system element 25. When there is an abnormality in the processing unit 22, the diagnosis unit 24 classifies an abnormal state of the processing unit 22 into plural state types and generates second diagnostic data indicating a classification result. It is assumed that the second diagnostic data includes the identification information unique to the edge device 20.

Next, as the data shaping process P4, the diagnosis unit 24 performs encoding and shaping processing of a data format suitable for transmitting the second diagnostic data to the diagnostic data cloud server 30. For example, when the network 1 is Ethernet, a process of storing the second diagnostic data in an Ethernet data container is performed. In the data shaping process P4, a format in a data container of each communication protocol can be generated without depending on a protocol standard used for communication.

Next, the communication unit 26 transmits the shaped second diagnostic data to the diagnostic data cloud server 30 via the network 1 according to a predetermined communication protocol.

In the data collection process P1, not only the state data is collected from each component of the system element 25, but also the abnormality signal S1 detected by the detection unit corresponding to each component may be received, and the next unit diagnosis process P2 may be started in response to reception of the abnormality signal S1. The abnormality signal S1 from the detection unit corresponding to each component may be added to the second diagnostic data as attribute information and transmitted to the diagnostic data cloud server 30.

As the state diagnosis process P11, the diagnostic data cloud server 30 that receives the second diagnostic data transmitted from the edge device 20 diagnoses presence or absence of an abnormality in the edge device 20 based on the second diagnostic data transmitted from the edge device 20, and takes over the second diagnostic data to the factor analysis process P12 and the location specification process P13 when there is an abnormality.

Next, as the factor analysis process P12, a failure factor causing the abnormality is analyzed based on the second diagnostic data. The failure factor includes a failure of hardware such as the processing unit 22 of the edge device 20 and the components of the system element 25, and an abnormality in an operation by software.

As a method for analyzing the failure factor, for example, a correlation between the operation state of the processing unit 22 stored in the second diagnostic data and the failure factor is ruled, and the failure factor is obtained based on the rule. As a method for implementing this rule, conditions and results may be listed, and machine learning using a neural network may be used. That is, any format associated with the correlation between the operation state of the processing unit 22 and the failure factor in the edge device and any method for searching for the correlation may be used.

Next, as the location specification process P13, based on the identification information unique to the edge device 20 included in the second diagnostic data, the components of the system element 25 of the edge device 20 are acquired from the configuration information database 31 to specify a failure occurrence location. As a method for specifying the location, the location may be obtained by using the correlation between the operation state of the processing unit 22 and the failure factor.

As described above, according to the distributed system $10_1$, it is possible to provide a technique in which the edge device 20 and the diagnostic data cloud server 30 outside the edge device 20 cooperate with each other to deal with an abnormal state in the edge device 20. Since physical state data of the components (the sensor unit, the power supply unit, the actuator unit, and the like) of the edge device 20 is not transmitted to the diagnostic data cloud server 30 as it is but is aggregated and transmitted to the second diagnostic data indicating the operation state of the processing unit 22, it is possible to reduce an amount of data communication for cooperation between the edge device 20 and the diagnostic data cloud server 30, and to generalize the diagnostic data without depending on a configuration of the edge device 20.

<Application Example of Distributed System $10_1$>

Next, FIG. 2 shows a data flow in a distributed system 1000, which is an application example of the distributed system $10_1$ shown in FIG. 1.

The distributed system 1000 is multilayered and includes one or more edge devices 20, one or more cloud servers (or computers) included in a data management layer 40, and one or more cloud servers (or computers) included in a data utilization layer 50.

In the distributed system 1000, the diagnostic data cloud server 30 in FIG. 1 is divided into a diagnostic data management cloud server 301 and an analysis outsourcing cloud server 302. The diagnostic data management cloud server 301 is disposed in the data management layer 40, and the analysis outsourcing cloud server 302 is disposed in the data utilization layer 50.

The edge device 20 includes the in-edge controller 21, a moving and actuating mechanism 251, and a sensor 252.

The in-edge controller 21 includes, for example, an electronic control unit (ECU), and controls the moving and actuating mechanism 251. The moving and actuating mechanism 251 is at least one of a moving mechanism and an actuating mechanism. The moving mechanism is, for example, an engine, or a motor in the moving body. The actuating mechanism is, for example, an actuator such as a motor or a hydraulic pressure in equipment. The moving and actuating mechanism 251 corresponds to an actuator unit that is a component of the system element 25 (FIG. 1). The sensor 252 is, for example, a global positioning system (GPS) receiver. The sensor 252 corresponds to a sensor unit included in the system element 25 (FIG. 1) and a detection unit corresponding thereto.

In relation to the moving and actuating mechanism 251, "actuating" means at least "performing a certain operation to change a state of a device according to an operated command thereof (JIS B 0132 Standard)".

In the following description, in order to simplify the description, a case where the edge device 20 is a moving body and the moving and actuating mechanism 251 is a moving mechanism will be described as an example. The in-edge controller 21 is abbreviated as the edge controller (ECTL) 21.

The ECTL 21 is in charge of at least a part of processing for implementing an automatic operation of the edge device 20. Therefore, the ECTL 21 is complicated in terms of hardware or software. For example, an example of hardware complexity may also include a graphics processing unit (GPU), a field-programmable gate array (FPGA), a neural network dedicated processor, and other hardware that accelerates machine learning in order to introduce a machine learning process or a process of recognizing and determining data input from various sensors or cameras in real time.

The data management layer 40 is a virtual layer or group introduced to simplify the description. The cloud server (or computer) included in the data management layer 40 is mainly used for storing data generated by the edge device 20.

The data management layer 40 may include a cloud server (or computer) other than the application described above. The cloud server (or computer) for the application described above may be omitted from the data management layer 40.

In FIG. 2, the data management layer 40 includes an edge device manufacturing company computer 41, an edge data distribution company cloud server (CS) 42, and a diagnostic data management cloud server (CS) 301.

The edge device manufacturing company computer 41 is a computer owned by a company that designs or manufactures the edge device 20. Since the manufacturing company manages edge data related to the edge device 20 for development and maintenance of its own product, the manufacturing company is included in the data management layer 40 for convenience. The edge device manufacturing company computer 41 transmits update data D23 of the edge data to the edge data distribution company cloud server 42.

The edge data distribution company cloud server 42 stores the edge data related to the edge device 20 and transmits, in response to a request from another cloud server, non-processed or processed edge data D25 to the cloud server that is a request source. The edge data D25 is assumed to be, for example, information on the components of the edge device 20.

Here, data processing includes, for example, a change of a data representation format, calculation of a difference value, calculation of a statistical value, encryption, decryption, compression, non-compression, removal of unnecessary data, addition or removal of a redundant code, and data extraction. If a part or all of the data received by a processing entity is modified and transmitted, it may be regarded as processing.

The diagnostic data management cloud server 301 shows an internal state of the ECTL 21, stores diagnostic data (hereinafter also referred to as in-edge controller diagnostic data or ECTL diagnostic data) D11 for diagnosis from an outside of the ECTL 21, and transmits non-processed or processed diagnostic data D21 and D27 in response to a request from another cloud server. The ECTL diagnostic data is an example of edge data.

As one viewpoint, a company having a cloud server (or computer) included in the data management layer 40 may be regarded as a company that designs and manufactures the edge device 20 and parts thereof, or a company that is in charge of distribution of edge data. From this viewpoint, a cloud server of a communication company, a company that provides a car navigation program executed by a smartphone, or a manufacturing company of a moving mechanism can be regarded as being included in the data management layer 40.

The data utilization layer 50 is a virtual layer or group introduced to simplify the description. The cloud server (or computer) included in the data utilization layer 50 is used for an application of taking charge of a part closer to service provision than the cloud server included in the data management layer 40.

As a service provided by the cloud server included in the data utilization layer 50, an edge device-related service that uses the edge device 20, targets an entity related to the edge device 20, or targets the edge device 20 itself is assumed.

Here, the entity is assumed to be, for example, a collection or a group of human beings, an animal, or a device (a traffic light, a ship that transports the edge device 20, or a device that supports an automatic operation of the edge device 20 outside the edge device 20).

In FIG. 2, the data utilization layer 50 includes a dealer and repair company cloud server (CS) 51, an insurance company cloud server (CS) 52, a transportation company cloud server (CS) 53, a MaaS company cloud server (CS) 54, a rental company cloud server (CS) 55, and an analysis outsourcing cloud server (CS) 302.

The dealer and repair company cloud server 51 receives the edge data D25 or post-analysis data D32 provided from the analysis outsourcing cloud server 302, generates information necessary for a maintenance service (failure prevention, repair, or the like) or a repair service (accident response), and presents the information to a user in order to support repair and maintenance arrangements for the edge device 20 and a business of a dealer or a repair company that repairs the edge device 20.

The insurance company cloud server 52 executes a part or all of processes for determining a premium rate with reference to the edge data D25 or the post-analysis data D32 provided by the analysis outsourcing cloud server 302 in an insurance company that takes on a predetermined risk related to a company business that exerts a predetermined function by using the edge device 20. The risk taken on by the insurance company may be a risk related to an entity using the edge device 20. For example, automobile insurance or the like contracted by an individual is assumed.

The transportation company cloud server 53 executes a process for providing a transportation service based on the edge data D25 or the post-analysis data D32 provided by the analysis outsourcing cloud server 302 in a transportation company that operates a transportation business by using the edge device 20 directly or by using a service of another transportation company. An example of the process is assumed to be an analysis process for a vehicle allocation plan of the edge device 20, calculation of a fare, revision of a service specification including the fare, or the like.

The mobility as a service (MaaS) company cloud server 54 receives the edge data D25 or the post-analysis data D31 provided by the analysis outsourcing cloud server 302 and generates information necessary for a maintenance plan or the like of a fleet, in order to support a business of a MaaS company that performs a service of providing moving systems by using the edge device 20 directly or by using a service of another company. The information is provided to an employee or the like of the MaaS company.

Similar to the MaaS company cloud server 54, the rental company cloud server 55 receives the edge data D25 or the post-analysis data D31 provided by the analysis outsourcing cloud server 302 and generates information necessary for the maintenance plan or the like of the fleet, in order to support a business of a rental company that performs a service of providing moving systems by using the edge device 20 directly or by using a service of another company. The information is provided to an employee or the like of the rental company.

The analysis outsourcing cloud server 302 is a cloud server serving as an outsourcing destination of a service-related analysis process necessary for service provision or service improvement of a company included in the data utilization layer 50. In the present embodiment, the analysis outsourcing cloud server 302 is in charge of outsourcing the analysis of the diagnostic data (particularly, ECTL diagnostic data) D11, and may be in charge of outsourcing the analysis of an edge device manufacturing company or the like included in the data management layer 40. The service-related analysis process performed by the analysis outsourcing cloud server 302 corresponds to a factor analysis process related to the internal state of the edge device 20 or the ECTL 21 in each solution to be described later.

A method for dividing the data management layer 40 and the data utilization layer 50 is not limited to the example shown in the same drawing, and may not be exclusive. For example, a cloud server of a communication company corresponds to the edge data distribution company cloud server 42 included in the data management layer 40 from a viewpoint of distribution of the edge data described above, and may be included in the data utilization layer 50 from a viewpoint of providing a "communication service" to the edge device 20.

Further, from another viewpoint, a company having a cloud server included in the data utilization layer 50 can be regarded as a company that does not design or manufacture the edge device 20 or the parts thereof.

<Configuration Example of Computer 100 Constituting Cloud Server>

Next, an example of a hardware configuration of a computer 100 constituting a cloud server such as the diagnostic data cloud server 30 is shown.

The computer 100 includes a processor 101, a memory 102, an external storage device 103, an audio output device 104, a biological information input device 105, an input device 106, an output device 107, and a communication device 108, which are connected with each other via a data bus 109.

The processor 101 includes a CPU, a GPU, an FPGA, and the like, and controls the entire computer 100. The memory 102 is a main storage device such as a random access memory (RAM). The external storage device 103 is a nonvolatile storage device such as a hard disk drive (HDD), a solid state drive (SSD), or a flash memory capable of storing digital information.

The audio output device 104 includes a speaker and the like. The biological information input device 105 includes a camera, an eye-gaze input device, a microphone, and the like. The input device 106 includes a keyboard, a mouse, a touch panel, and the like. The output device 107 includes a display, a printer, and the like.

The communication device 108 includes a network interface card (NIC) and the like. The communication device 108 communicates with another device connected to the same network by at least one of wired communication and wireless communication. For the communication, packet communication based on a transmission control protocol/internet protocol (TCP/IP) is adopted, but the communication is not limited thereto, and communication based on other protocols such as a user datagram protocol (UDP) may be adopted.

The hardware configuration of the computer 100 is not limited to the example described above, and some of the components described above may be omitted or other components may be included. The computer 100 may be various information processing devices such as a server computer, a personal computer, a notebook computer, a tablet computer, a smartphone, and a television device.

The computer 100 can store programs such as an operating system (OS), middleware, and an application program, can read the programs from an outside, and can execute various processes by the processor 101 executing the programs.

<Method for Classifying Failure Factor and Diagnostic Data in Components of Edge Device 20>

Next, FIG. 4 shows a method for classifying a failure factor and diagnostic data in components of the edge device 20.

When a physical failure 201 occurs in the components of the edge device 20 (the sensor unit, the power supply unit, the actuator unit, and the like of the system element 25 (FIG. 1)), the failure 201 appears as an abnormality in a function of the edge device 20 (functional failure 202). The functional failure 202 is detected by a mechanism that detects a functional failure of the edge device 20. Then, a detection result 203 thereof is converted into the diagnostic data 204 aggregated for each type of abnormal state or detection state.

For example, when the "open" failure 201 occurs in which a bus that transmits data output by the sensor 252 is disconnected, a "data communication abnormality" occurs as the functional failure 202. Then, the processing unit 22 captures a phenomenon caused by the "data communication abnormality" as first diagnostic data indicating a state of "read back detection", and converts the "read back detection" into diagnostic data (second diagnostic data) 204 indicating a state of "data inconsistency".

When abnormal states of the components of the edge device 20 are regarded as physical phenomena such as "open", "short circuit between wires", and "power supply short circuit", the number of types thereof is very large, and various types of data need to be handled since various phenomena are handled for each component of the system element 25. However, in the present embodiment, the types of data (second diagnostic data) to be transmitted to a diagnostic data cloud server 30a can be greatly reduced by aggregating these phenomena as the state of the processing unit 22.

<Configuration Example of Distributed System 10₂ according to Second Embodiment of Invention>

FIG. 5 shows a configuration example of a distributed system 10₂ according to a second embodiment of the invention.

In addition to the same functions as the distributed system 10₁ (FIG. 1), the distributed system 10₂ can request detailed state data from the diagnostic data cloud server 30 to the edge device 20.

The distributed system 10₂, in contrast with the distributed system 10₁, adds a related information search process P14 to processes executed by the diagnostic data cloud server 30 and provides an address storage memory 242 in the diagnosis unit 24 of the edge device 20.

In the distributed system 10₂, when the diagnostic data cloud server 30 receives, from the edge device 20, second diagnostic data in which abnormal states in the processing unit 22 of the edge device 20 are aggregated, as the state diagnosis process P11, the diagnostic data cloud server 30 diagnoses presence or absence of an abnormality in the edge device 20 based on the second diagnostic data transmitted from the edge device 20, and takes over the second diagnostic data to the factor analysis process P12 and the location specification process P13 when there is an abnormality.

Next, as the factor analysis process P12, a failure factor causing the abnormality is analyzed based on the second diagnostic data. Next, as the location specification process P13, based on identification information unique to the edge device 20 included in the second diagnostic data, components of the system element 25 of the edge device 20 are acquired from the configuration information database 31 to specify a failure occurrence location.

The related information search process P14 is executed in order to improve certainty of specifying an abnormal location or specify a more detailed abnormality location of the system element 25. Specifically, in the location specification process P13, a detailed information request command including information specifying a component specified as a candidate for an abnormal location is issued and transmitted to the edge device 20 via the network 1.

The detailed information request command includes, for example, an access position address of a register that stores an internal state of an image processing large scale integration (LSI), in order to specify which one of a camera, the image processing LSI, and an image memory in a camera module that is a component of the system element 25 has an abnormality and to specify a location at a component level.

In the edge device 20, the communication unit 26 receives the detailed information request command from the diagnostic data cloud server 30, and stores, in the address storage memory 242 of the diagnosis unit 24, the access position address stored in the detailed information request command for reading the register that stores a state of the system element 25. A collection procedure thereof is stored in the sequence storage memory 241. The access position address is, for example, an access space address of various registers of the system element 25, which is managed by the processing unit 22.

Thereafter, the diagnosis unit 24 reads state data stored in the access position address in the data collection process P1, generates first diagnostic data including the state data in the unit diagnosis unit P2, converts the first diagnostic data into second diagnostic data in the data conversion process P3, and shapes diagnostic data of a base 2 in the data shaping process P4. Then, the communication unit 26 transmits the diagnostic data to the diagnostic data cloud server 30.

According to the distributed system $10_2$ described above, in addition to the same functions and effects as those of the distributed system $10_1$, the diagnostic data cloud server 30 can discriminate which location of the system element 25 in the edge device 20 has an abnormality with fine granularity.

Next, FIG. 6 shows an example of a data structure of second diagnostic data transmitted from the edge device 20 to the diagnostic data cloud server 30.

The second diagnostic data converted in the data conversion process P3 includes a diagnostic data type field, a domain name field, a processor I/F field, a data collection time field, and a state data field.

The diagnostic data type field stores a diagnostic data type obtained by aggregating and classifying abnormal states. Specifically, the diagnostic data type includes, for example, periodic observation data, a bit error, data inconsistency, a test error, a data number error, a timeout, a range violation, a data order violation, an element error, a Watchdog timer error, a processing unit error notification, a memory abnormality, and a processing unit exception error.

The domain name field stores a domain name indicating a type of an input and output I/F in which an abnormality is detected by the processing unit 22. Examples of the domain name include a digital I/O, a memory bus, a communication bus, and an interrupt.

The processor I/F field stores a signal name of the processing unit 22 that detects an abnormality. Specifically, for example, a pin group and a pin number are stored as the signal name.

The data collection time field stores time when the state data is detected and collected. Specifically, an abnormality detection time, a diagnostic data collection time, and the like are stored.

The state data field stores state data when a state of the edge device 20 is periodically monitored. Specifically, state data of the system element 25, input and output data to and from an outside of the edge device 20, and the like are stored.

Information stored in the domain name field, the processor I/F field, the data collection time field, and the state data field corresponds to factor identification auxiliary information of the invention, and is used in the factor analysis process P12.

The data structure of the second diagnostic data is not limited to the shown example, and may be changed in accordance with the type of the edge device 20 or the method of a factor analysis.

Next, FIG. 7 shows an example of a transmission and reception protocol between the edge device 20 and the diagnostic data cloud server 30.

In the edge device 20, the diagnosis unit 24 periodically monitors the state of the system element 25 at a predetermined period, and transmits second diagnostic data indicating a state of the processing unit 22 caused by the state of the system element 25 to the diagnostic data cloud server 30.

The predetermined period is set in advance, and can be changed from the diagnostic data cloud server 30 side in a third embodiment described later.

The diagnostic data cloud server 30 stores the received second diagnostic data in the configuration information database 31. The stored second diagnostic data is used as history information for a failure factor analysis. When an abnormality occurs in the edge device 20, the diagnosis unit 24 transmits the second diagnostic data indicating occurrence of an abnormality to the diagnostic data cloud server 30 (The data collection process P1, the unit diagnosis process P2, the data conversion process P3, and the data shaping process P4 in FIG.

The diagnostic data cloud server 30 executes a factor analysis and an occurrence location specification process based on the second diagnostic data. Then, when collecting detailed information, the diagnostic data cloud server 30 issues and transmits a detailed information request command to the edge device 20 (related information search process P14 in FIG. 5). In accordance with the received detailed information request command, the edge device 20 reads the state data, converts the state data into the second diagnostic data, and transmits the second diagnostic data to the diagnostic data cloud server 30.

Thereafter, the edge device 20 periodically transmits the second diagnostic data to the diagnostic data cloud server 30 at a predetermined period.

As can be seen from FIG. 7, the edge device 20 can periodically transmit the second diagnostic data indicating the state of the processing unit 22 at a predetermined period to the diagnostic data cloud server 30. When an abnormality occurs, the edge device 20 can periodically transmit the second diagnostic data indicating occurrence of the abnormality to the diagnostic data cloud server 30 at a predetermined period.

<Configuration Example of Distributed System $10_3$ According to Third Embodiment of Invention>

FIG. 8 shows a configuration example of a distributed system $10_3$ according to a third embodiment of the invention.

In addition to the same functions as those of the distributed system $10_1$ (FIG. 1), the distributed system $10_3$ can change a period of periodically transmitting second diagnostic data from the edge device 20 to the diagnostic data cloud server 30 from the diagnostic data cloud server 30 side.

The distributed system $10_3$, in contrast with the distributed system $10_1$ (FIG. 1), provides a diagnosis result memory 32 in the diagnostic data cloud server 30, adds a diagnosis result statistical process P15, and provides the address storage memory 242 in the diagnosis unit 24 of the edge device 20.

In the distributed system $10_3$, when the diagnostic data cloud server 30 receives, from the edge device 20, the second diagnostic data in which abnormal states in the processing unit 22 of the edge device 20 are aggregated, as the state diagnosis process P11, the diagnostic data cloud server 30 diagnoses presence or absence of an abnormality in the edge device 20 based on the second diagnostic data transmitted from the edge device 20, and takes over the second diagnostic data to the factor analysis process P12 and the location specification process P13 when there is an abnormality.

Next, as the factor analysis process P12, a failure factor causing the abnormality is analyzed based on the second diagnostic data. Next, as the location specification process P13, based on identification information unique to the edge device 20 included in the second diagnostic data, components of the system element 25 of the edge device 20 are acquired from the configuration information database 31 to specify a failure occurrence location, and the failure occurrence location is stored in the diagnosis result memory 32 and is taken over to the diagnosis result statistical process P15. When there is no abnormality in the edge device 20, the periodic second diagnostic data from the edge device 20 is taken over to the diagnosis result statistical process P15.

In the diagnosis result statistical process P15, a statistical process is performed based on the failure occurrence location when there is an abnormality in the edge device 20 or the second diagnostic data when there is no abnormality in the edge device 20, and candidates for the components of the system element 25 in which an abnormality or the like may occur are derived.

In the statistical process, for example, a change in an error frequency of a data communication portion in the system element 25 is monitored, a time-series change amount is calculated, and a collection timing change command for changing a collection sequence, such as shortening a periodic state data collection interval of the data communication portion or reading the state data (status register or the like) in the related system element 25, is transmitted to the edge device 20 when an inclination of a change amount exceeds a predetermined threshold value. In the edge device 20, the collection procedure stored in the sequence storage memory 241 is changed or an address of the address storage memory 242 is changed based on the collection timing change command. In this way, in the edge device 20, the period of periodically transmitting the second diagnostic data to the diagnostic data cloud server 30 is changed.

According to the distributed system $10_3$ described above, in addition to the same functions and effects as those of the distributed system $10_1$, it is possible to grasp a sign of a functional failure before the functional failure occurs in the edge device 20.

<Display Example of Information Presentation Screen 600>

Next, FIG. 9 shows a display example of an information presentation screen 600 of, for example, the dealer and repair company cloud server 51 (FIG. 2). The information presentation screen 600 is used to request a factor analysis result and detailed state data of a failure occurring in the edge device 20.

The information presentation screen 600 displays a factor analysis result and a state data collection result of a failure by the diagnostic data cloud server 30. Specifically, a result of diagnosing the second diagnostic data periodically collected at a predetermined period by the state diagnosis process P11 is displayed in time series. When there is no abnormality in the edge device 20, information indicating that there is no abnormality and the state data periodically collected are displayed. When an abnormality occurs in the edge device 20, a message notifying occurrence of an abnormality is displayed, and processing results of the factor analysis process P12 and the location specification process P13 are displayed as related locations (abnormal location candidates). Furthermore, when the detailed information request command is issued by the related information search process P14, a type of the detailed information request command and address information are displayed, and the factor analysis result and a processing flow of a detailed information request are displayed in time series.

In FIG. 9, the information presentation screen 600 includes a display region 601 that displays a name and a model number representing the edge device 20 to be subjected to a factor analysis, a display region 602 that displays a history of a use entity, and a display region 603 that displays an analysis result.

In the display region 601, for example, when the edge device subject to the factor analysis is an automobile, a vehicle type, a model, a configuration information ID, and the like are displayed. In the display region 602, an ID of an entity using the edge device 20 is displayed in a history format. Other histories (for example, an operation start date and a maintenance history) may be displayed in the display region 602.

The display region 603 displays a processor unit (PU) state, an ID of a component in an abnormal state, a date and time of occurrence of the abnormal state, a state display of a processing unit, an abnormality occurrence location candidate, a command issuance log, information indicating an abnormality factor, and the like. However, it is not necessary to display all items described above. Here, the abnormality factor includes information for determining whether the abnormality is a software abnormality or a hardware abnormality according to the abnormality factor that occurs. This is because methods for resolving the software abnormality and the hardware abnormality often differ greatly.

By displaying such an information presentation screen 600, a dealer or a repair company can quickly know that the edge device 20 is in an abnormal state and needs to be repaired. Since it is not necessary for the dealer or the repair company to specify a component that needs to be replaced by using design data, a wide range of people can engage in repairs at the dealer or the repair company.

A solution for the dealer or the repair company described above can also be applied to a rental company or a MaaS company. However, the rental company or the MaaS company does not repair the edge device 20 more finely than the dealer or the repair company. Moreover, when a service is provided by the rental company or the MaaS company, a proper cost can be obtained from a user of the service because the edge device 20 is operating normally.

Information for further reducing recovery time from an abnormal state of the edge device 20 includes a position, an emergency level, and required response time. The rental company or the MaaS company can select an appropriate recovery method in consideration of these factors. As a recovery method that can be performed by providing the information presentation screen 600, for example, the following methods are assumed.

Method 1: The edge device 20 whose abnormal state occurrence position is farther than a base position of the rental company or the MaaS company is preferentially recovered. An example that reflects this priority is an arrangement of the alternative edge device 20.

Method 2: An abnormal state having a low emergency level is resolved before the abnormal state becomes an abnormal state having a high emergency level. In the present embodiment, it is possible to finely determine an emergency response level based on an internal state of the ECTL 21. The emergency level may be set by performing a correlation analysis of ECTL diagnostic data as an analysis process in the analysis outsourcing cloud server 302 and obtaining the correlation as post-analysis data. For example, if an abnormal state is not fatal to the edge device 20 by itself, a priority can be set to be low, and if an abnormal state having a high correlation has a high emergency level, the former abnormal state is set to be middle or high, which is higher than low.

Method 3: A priority is given to recovery work based on an emergency level. In particular, when abnormal states having different emergency levels occur in the same edge device 20, the abnormal state having the low emergency level may be resolved by resolving the abnormal state having the high emergency level.

Next, a case where this solution is applied to an insurance company will be described.

As for insurance contract conditions, even if an insurance premium is low, a contract entity will not reach a contract if insurance payment conditions are strict. On the other hand, if the insurance payment conditions are excessively relaxed, the balance of payments of the insurance company excessively deteriorates, and the service cannot be continued. Therefore, by referring to processed data to be provided by the analysis outsourcing cloud server 302, it is possible to set an insurance payment condition based on an occurrence frequency of an abnormal state inside the edge device 20.

It is possible to optimize the insurance premium by increasing the insurance premium when it is found that the occurrence frequency of the abnormal state inside the edge device 20 is high under a specific condition (for example, a type of the edge device 20, an usage environment, and a type of a use entity) and inversely decreasing the insurance premium when the occurrence frequency is low under the specific condition.

By monitoring a state of the edge device 20, it is possible to deal with a situation before a functional failure occurs, and a potential of preventing an opportunity loss due to an accident or a failure is increased. In this case, insurance payment can be reduced, and a premium rate can be reduced. This advantage is large when the number of abnormalities related to the edge device 20 increases due to the spread of an automatic operation.

The technique according to the invention is not limited to the distributed system and the data transmission method, and can be provided in various forms such as a computer and a computer readable program.

The invention is not limited to the embodiments described above, and various modifications can be made. For example, the embodiments described above are described in detail for easy understanding of the invention, and are not necessarily limited to those including all the configurations described above. Further, a part of the configuration of an embodiment may be replaced with or added to the configuration of another embodiment.

A part or all of the configurations, functions, processing units, processing methods or the like described above may be implemented by hardware such as through design using an integrated circuit. The above configurations, functions, or the like may be implemented by software by means of a processor interpreting and executing a program for implementing respective functions. Information such as a program, a table, and a file for implementing the respective functions can be stored in a recording device such as a memory, a hard disk, or a SSD, or in a recording media such as an IC card, an SD card, or a DVD. Control lines or information lines indicate what is considered necessary for description, and not all the control lines or information lines are necessarily shown in a product. It may be considered that almost all the configurations are actually connected to each other.

REFERENCE SIGN LIST

1 network
20 edge device
21 in-edge controller
22 processing unit
23 control unit
24 diagnosis unit
25 system element
26 communication unit
30 diagnostic data cloud server
31 configuration information database
32 diagnosis result memory
40 data management layer
41 edge device manufacturing company computer
42 edge data distribution company cloud server
50 data utilization layer
51 dealer and repair company cloud server
52 insurance company cloud server
53 transportation company cloud server
54 MaaS company cloud server
55 rental company cloud server
100 computer
101 processor
102 memory
103 external storage device
104 audio output device
105 biological information input device
106 input device
107 output device
108 communication device
109 data bus
241 sequence storage memory
242 address storage memory
251 moving and actuating mechanism
252 sensor
301 diagnostic data management cloud server
302 analysis outsourcing cloud server
600 information presentation screen
601 display region
602 display region
603 display region
1000 distributed system

The invention claimed is:

1. A distributed system comprising:
an edge device that is at least one of an automatically operable moving body and equipment; and
a diagnostic data computer, wherein
the edge device includes an in-edge controller including at least a processing unit, and a system element to be monitored by the in-edge controller,
the processing unit diagnoses presence or absence of an abnormality in the processing unit due to an abnormality occurring in the system element, generates first diagnostic data indicating presence or absence of the abnormality in the processing unit, aggregates the first diagnostic data for each type of abnormal state as aggregated first diagnostic data, converts the aggregated first diagnostic data into second diagnostic data indicating a type of the abnormality in the processing unit and being independent of the configuration of the edge device, and transmits the second diagnostic data to the diagnostic data computer, which analyzes a cause of the abnormality in the processing unit based on the second diagnostic data,
the diagnostic data computer transmits a collection timing change command instructing a change of a transmission period of the second diagnostic data to the edge device, and
the collection timing change command is transmitted to the edge device based on a determination that a change in an error frequency of a data communication portion in the system element exceeds a predetermined threshold value.

2. The distributed system according to claim 1, wherein the diagnostic data computer includes a configuration information database that stores information indicating a component included in the system element of the edge device, and specifies, with reference to the configuration information database and based on the second diagnostic data transmitted from the edge device, the component in which an abnormality occurs in the system element of the edge device.

3. The distributed system according to claim 1, wherein the diagnostic data computer includes a configuration information database that stores information indicating a component included in the system element of the edge device, specifies, with reference to the configuration information database and based on the second diagnostic data transmitted from the edge device, a candidate of the component in which an abnormality occurs in the system element of the edge device, issues a detailed information request command requesting detailed information on the candidate, and transmits the command to the edge device.

4. The distributed system according to claim 3, wherein the edge device reads state data of the candidate from a register corresponding to address information included in the detailed information request command transmitted from the diagnostic data computer, stores the read state data in the second diagnostic data, and transmits the read state data to the diagnostic data computer.

5. The distributed system according to claim 1, wherein the second diagnostic data includes factor identification auxiliary information, and the diagnostic data computer analyzes a factor of an abnormality in the processing unit based on the factor identification auxiliary information.

6. A data transmission method in a distributed system, the distributed system including a diagnostic data computer and an edge device that is at least one of an automatically operable moving body and equipment, the edge device including an in-edge controller including at least a processing unit, and a system element to be monitored by the in-edge controller, the data transmission method comprising:

diagnosing, by the processing unit, presence or absence of an abnormality in the processing unit due to an abnormality occurring in the system element;

generating, by the processing unit, first diagnostic data indicating presence or absence of the abnormality in the processing unit;

aggregating the first diagnostic data for each type of abnormal state as aggregated first diagnostic data;

converting, by the processing unit, the aggregated first diagnostic data into second diagnostic data indicating a type of the abnormality in the processing unit and being independent of the configuration of the edge device; and transmitting, by the processing unit, the second diagnostic data to the diagnostic data computer, which analyzes a cause of the abnormality in the processing unit based on the second diagnostic data;

wherein the diagnostic data computer transmits a collection timing change command instructing a change of a transmission period of the second diagnostic data to the edge device, and wherein the collection timing change command is transmitted to the edge device based on a determination that a change in an error frequency of a data communication portion in the system element exceeds a predetermined threshold value.

* * * * *